United States Patent
Zhang

(10) Patent No.: US 12,105,695 B2
(45) Date of Patent: Oct. 1, 2024

(54) ENCODING METHOD FOR KEY TRIE, DECODING METHOD FOR KEY TRIE, AND ELECTRONIC DEVICES

(71) Applicant: VIA Technologies Inc., New Taipei (TW)

(72) Inventor: Peng Zhang, Beijing (CN)

(73) Assignee: VIA Technologies Inc., New Taipei (TW)

( * ) Notice: Subject to any disclaimer, the term of this patent is extended or adjusted under 35 U.S.C. 154(b) by 182 days.

(21) Appl. No.: 17/363,031

(22) Filed: Jun. 30, 2021

(65) Prior Publication Data

US 2022/0197884 A1  Jun. 23, 2022

(30) Foreign Application Priority Data

Dec. 18, 2020  (CN) .......................... 202011508208.6

(51) Int. Cl.
*G06F 16/22* (2019.01)

(52) U.S. Cl.
CPC ...... *G06F 16/2282* (2019.01); *G06F 16/2246* (2019.01); *G06F 16/2272* (2019.01)

(58) Field of Classification Search
CPC ............. G06F 16/2246; G06F 16/2272; G06F 16/2282

See application file for complete search history.

(56) References Cited

U.S. PATENT DOCUMENTS

| | | | |
|---|---|---|---|
| 9,934,246 B2 | 4/2018 | Raja | |
| 2003/0204513 A1* | 10/2003 | Bumbulis | G06F 16/2246 |
| 2015/0248448 A1* | 9/2015 | Tsirkin | G06F 16/9027 |
| | | | 707/741 |
| 2015/0324401 A1* | 11/2015 | Tsirkin | G06F 16/24561 |
| | | | 707/693 |
| 2020/0349139 A1 | 11/2020 | Boles | |

FOREIGN PATENT DOCUMENTS

| | | | | |
|---|---|---|---|---|
| CN | 100576750 C | 12/2009 | | |
| WO | WO-2009078028 A1 * | 6/2009 | ............. | H04L 45/00 |
| WO | 2018/148203 A1 | 8/2018 | | |
| WO | WO-2019098871 A1 * | 5/2019 | ......... | G06F 16/2246 |

OTHER PUBLICATIONS

Vaidehi Joshi, Compressing Radix Trees Without (Too Many) Tears, Aug. 7, 2017 [retrieved on Mar. 20, 2023], Retrieved from the Internet <URL: https://medium.com/basecs/compressing-radix-trees-without-too-many-tears-a2e658adb9a0> (Year: 2017).*

* cited by examiner

*Primary Examiner* — James E Richardson
(74) *Attorney, Agent, or Firm* — Winston Hsu

(57) ABSTRACT

An encoding method for a key Trie includes generating a plurality of meta data by applying encoding to a portion of non-leaf nodes of the key Trie, and storing an encoding result of the key Trie into a storage device, wherein the encoding result includes the plurality of meta data corresponding to the portion of non-leaf nodes, respectively.

16 Claims, 7 Drawing Sheets

| KA | KB | KC | KD | KE | KF | KG | KH | KI |
|----|----|----|----|----|----|----|----|----|
| 0  | 0  | 0  | 0  | 0  | 0  | 1  | 1  | 1  |
| 0  | 0  | 1  | 1  | 1  | 1  | 1  | 1  | 1  |
| 0  | 0  | 0  | 0  | 0  | 0  | 1  | 1  | 1  |
| 0  | 0  | 0  | 0  | 1  | 1  | 1  | 1  | 1  |
| 0  | 0  | 0  | 0  | 0  | 0  | 0  | 1  | 1  |
| 0  | 0  | 0  | 0  | 0  | 0  |    | 1  | 1  |
| 0  | 0  | 0  | 0  | 0  | 0  |    | 0  | 1  |
| 0  | 0  | 0  | 0  | 0  | 1  |    |    |    |
| 0  | 0  | 0  | 0  |    | 1  |    |    |    |
| 0  | 1  | 0  | 1  |    | 0  |    |    |    |

ENCODING METHOD FOR KEY TRIE, DECODING METHOD FOR KEY TRIE, AND ELECTRONIC DEVICES

BACKGROUND OF THE INVENTION

1. Field of the Invention

The present invention is related to data management, and more particularly, to an encoding method for a key Trie, a decoding method for a key Trie, and associated electronic devices.

2. Description of the Prior Art

With the rapid growth of the amount of data on the Internet, it has become more and more common to use key-value combinations to organize and manage large amounts of data. As a result, how to effectively store the key-value combinations and quickly retrieve a corresponding value through an input key has become an important issue. Generally speaking, a plurality of keys may form a tree structure of a key Trie according to a typical binary tree structure with a node's left subtree representative of "0" and a node's right subtree representative of "1". When receiving an input key, a leaf node corresponding to the input key may be found based on the tree structure of the key Trie, and the corresponding value may be retrieved according to the leaf node. However, when the key length of the plurality of keys constituting the key Trie is very long, if the search is directly performed based on the key Trie, a large memory capacity is required to completely store the data of the key Trie, and a lot of comparison computations are required to be performed for finding a leaf node in the key Trie that corresponds to the input key.

SUMMARY OF THE INVENTION

It is therefore an objective of the present invention to provide an encoding method for a key Trie, a decoding method for a key Trie, and associated electronic devices.

In an embodiment of the present invention, an encoding method for key Trie is provided. The encoding method includes: generating a plurality of meta data by applying encoding to a portion of non-leaf nodes of the key Trie; and storing an encoding result of the key Trie into a storage device, wherein the encoding result includes the plurality of meta data corresponding to the portion of non-leaf nodes, respectively.

In another embodiment of the present invention, a decoding method for key Trie is provided. The decoding method includes: reading a meta data of a plurality of meta data included in an encoding result of the key Trie from a storage device, wherein the meta data includes a depth value of a corresponding non-leaf node in the key Trie; according to a bit value of a bit in an input key that corresponds to the depth value, selectively updating a key index value; and according to a leaf count of an one-sided sub-Trie of the corresponding non-leaf node indicated by the bit, determining whether decoding operation of the key index value finishes.

In another embodiment of the present invention, an electronic device is provided. The electronic device includes a storage device and a processing circuit. The processing circuit is arranged to generate a plurality of meta data by applying encoding to a portion of non-leaf nodes of a key Trie; and store an encoding result of the key Trie into a storage device, wherein the encoding result includes the plurality of meta data corresponding to the portion of non-leaf nodes, respectively.

In another embodiment of the present invention, an electronic device is provided. The electronic device includes a storage device and a processing circuit. The processing circuit is arranged to read a meta data in a plurality of meta data included in an encoding result of a key Trie from the storage device, wherein the meta data includes a depth value of a corresponding non-leaf node in the key Trie; according to a bit value of a bit in an input key that corresponds to the depth value, selectively update a key index value; and according to a leaf count of an one-sided sub-Trie of the corresponding non-leaf node indicated by the bit, determine whether decoding operation of the key index value finishes.

Regarding the encoding operation, it is assumed that the number of the plurality of keys included in the key group is N and the maximum length of the key is M bits. Each non-leaf node with degree of 2 in the key Trie is encoded as a meta data (D, NL), wherein the depth value D needs $\log_2 M$ bits for storage, and the left sub-Trie leaf count NL needs $\log_2 N$ bits for storage. As a result, the decoding method of the present invention requires the buffer size of the storage device to be $(N-1)*(\log_2 M + \log_2 N)$. Since the buffer size requirement $(N-1)*(\log_2 M + \log_2 N)$ is fixed, the storage device can be easily managed. In addition, regarding the decoding operation, at most $(N-1)$ meta data stored in the storage device needs to be decoded, so the complexity of the worst case is $O(N)$, and the complexity of the general case is $O(\log N)$. Therefore, the decoding method of the present invention is very fast and efficient.

These and other objectives of the present invention will no doubt become obvious to those of ordinary skill in the art after reading the following detailed description of the preferred embodiment that is illustrated in the various figures and drawings.

DETAILED DESCRIPTION

Figures 1, 2:
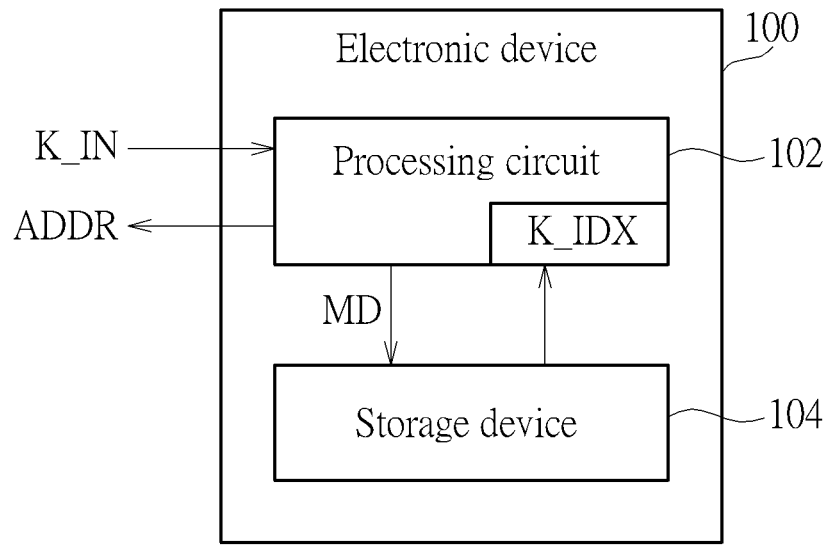
FIG. 1 is a diagram illustrating an electronic device according to an embodiment of the present invention.
FIG. 2 is a list of a plurality of keys belonging to a same key group.

FIG. 1 is a diagram illustrating an electronic device according to an embodiment of the present invention. As shown in FIG. 1, an electronic device 100 includes (but not limited thereto) a processing circuit 102 and a storage device 104. For example, the processing circuit 102 may be a general purpose processor, a field programmable logic gate (FPGA), or any circuit with computing capability, and the storage device 104 may be an on-chip memory, an off-chip memory, or any storage element with the ability to temporarily store data. In the embodiment, the electronic device 100 may realize the proposed encoding method and decoding method applied to a key Trie by loading and executing the program code. In addition, the electronic device 100 may be applicable to managing a key Trie corresponding to a plurality of keys in a key-value store of a distributed storage system. For example, the distributed storage system may be an object storage system, and the keys of the key-value store may be sorted and categorized into a plurality of key groups, wherein each key group may include a plurality of keys (i.e. a portion of keys in the key-value store) and construct a key Trie on the basis of the keys, and the encoding method and the decoding method of the present invention may be applicable to a key Trie corresponding to each key group.

Figure 3:
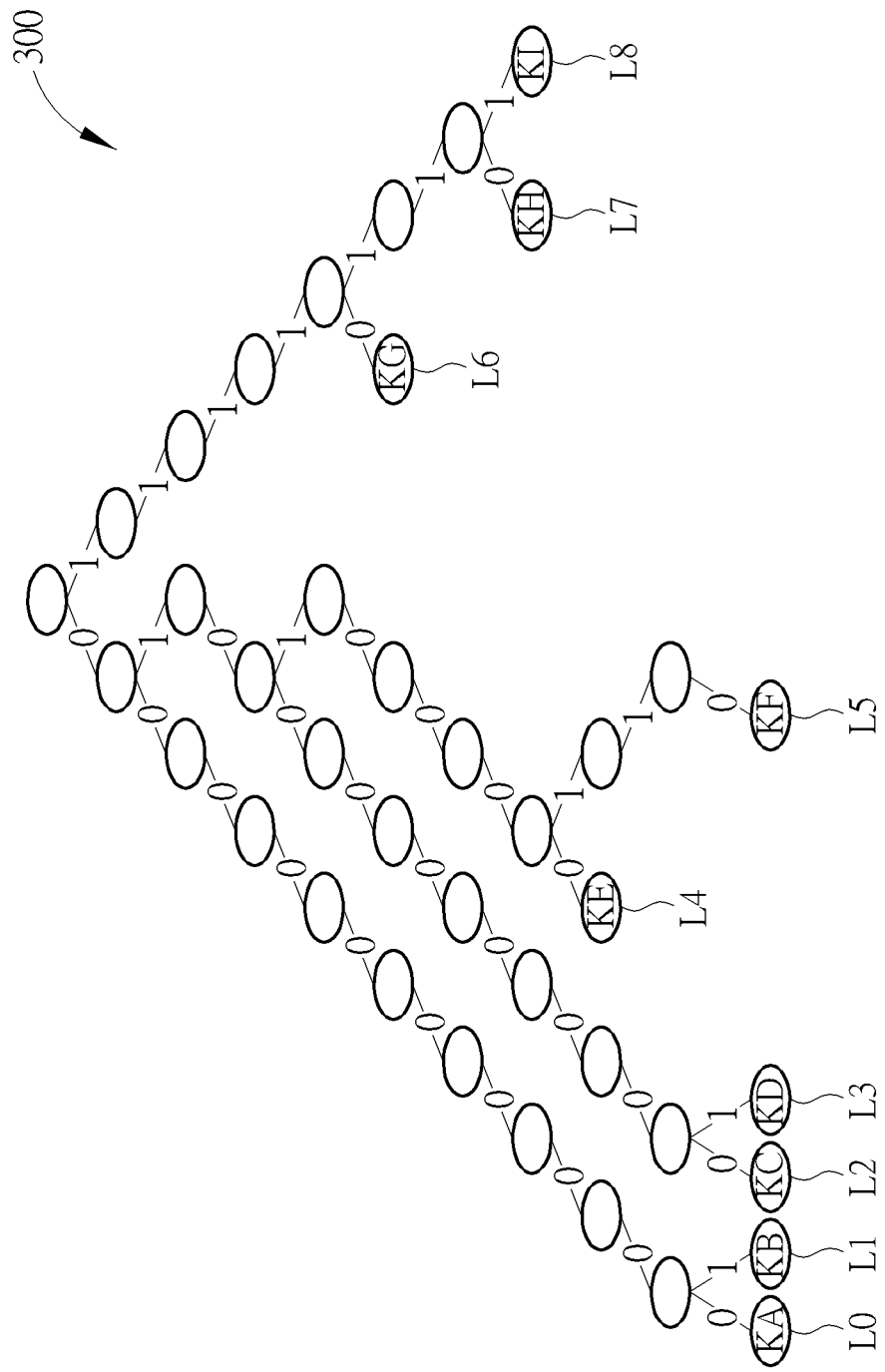
FIG. 3 is a diagram illustrating a key Trie corresponding to a plurality of keys.

Assuming that the number of the plurality of keys included in the key group is N, the key Trie therefore has N leaf nodes. In addition, assuming that the maximum length of the keys is M bits, the depth of the key Trie is M. When the keys managed by the electronic device 100 is from the distributed storage system (e.g. object storage system), since many objects need to be identified, the length of each key may reach 256 bytes or even longer. In order to facilitate the description of the technical content of the encoding method and the decoding method of the present invention, it is assumed that the key group to be processed in the following embodiments includes 9 keys KA, KB, KC, KD, KE, KF, KG, KH, KI (N=9), and the maximum length of the keys is 10 bits (M=10). FIG. 2 is a list of 9 keys KA-KI belonging to a same key group. FIG. 3 is a diagram illustrating a key Trie 300 corresponding to 9 keys KA-KI, wherein leaf nodes L0-L8 correspond to the keys KA-KI, respectively. In addition, in this embodiment, key indexes of the keys KA-KI, from left to right, are set as 0-8, respectively.

To quickly find a desired key from these keys in the key Trie, the encoding method of the present invention performs encoding process on the key Trie, and generates a meta data as an encoding result of the key Trie, wherein the meta data includes index information related to these keys. Compared with encoding all non-leaf nodes in the key Trie 300, the encoding method of the present invention may encode a portion of the non-leaf nodes in the key Trie 300 (e.g. nodes, each with degree greater than 1). In this way, when the portion of the non-leaf nodes in the key Trie 300 need to be encoded and another portion of the non-leaf nodes do not need to be encoded, since the number of non-leaf nodes that are actually encoded is less than the number of all non-leaf nodes, the encoding efficiency may be improved and the storage space required for the encoding result may be reduced. As shown in FIG. 3, the key Trie 300 is a tree structure constructed according to a typical binary tree structure with a node's left subtree representative of "0" and a node's right subtree representative of "1". If it is assumed that the number of leaf nodes is n0 and the number of nodes, each with degree of 2, is n2, then n0=n2+1 according to the characteristics of the binary tree itself. In addition, only nodes, each with degree of 2, are related to the offsets of keys. According to these observed characteristics, in an embodiment of the present invention, the encoding method may encode the portion of the non-leaf nodes in the key Trie 300 (e.g. nodes, each with degree of 2) to generate a plurality of meta data, and write an encoding result MD of the key Trie 300 into the storage device 104, wherein the encoding result MD includes the plurality of meta data corresponding to the portion of the non-leaf nodes (e.g. nodes, each with degree of 2), respectively.

Figure 4:
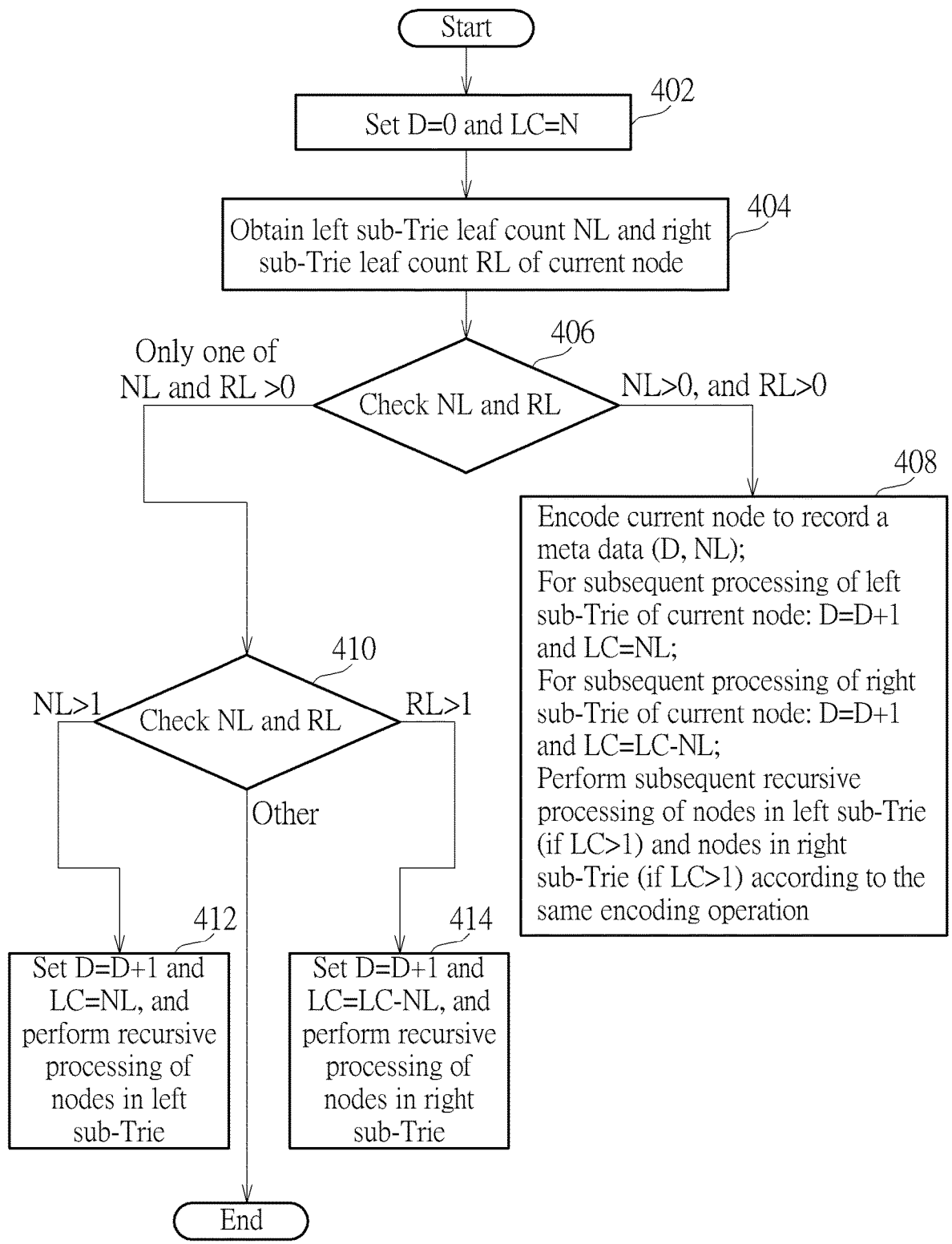
FIG. 4 is a flow chart of an encoding method for a key Trie according to an embodiment of the present invention.

FIG. 4 is a flow chart of an encoding method for a key Trie according to an embodiment of the present invention. Please note that if the same result can be obtained, the steps do not have to be executed in the exact order shown in FIG. 4. The encoding method is executed by the processing circuit 102. For example, the processing circuit 102 may load and execute the program code to generate the encoding result MD of the key Trie. In addition, the encoding method starts from the root node with a depth of 0, and follows a depth first traversal order to sequentially check non-leaf nodes in the key Trie for determining whether each non-leaf node in the key Trie needs to be encoded. When it is determined that the current non-leaf node needs to be encoded, a meta data is recorded as an encoding output of this non-leaf node, and the processing of the next non-leaf node is continued according to the depth first traversal order. When it is determined that the current non-leaf node does not need to be encoded, there is no need to record the meta data of this non-leaf node, and the processing of the next non-leaf node is also continued according to the depth first traversal order. The encoding method continues to check non-leaf nodes in the key Trie until all non-leaf nodes each with degree of 2 in the key Trie have been encoded. Further description of the encoding method is as follows.

In Step 402, the encoding method first processes the root node, wherein the depth of the root node is 0. As a result, a depth value D of the current non-leaf node to be processed is set as 0 (i.e. D=0), and a leaf count LC related to the current non-leaf node to be processed is set as N (i.e. LC=N). Taking the key Trie 300 shown in FIG. 3 for example, the leaf count related to the root node is the number of all keys KA-KI included in the key Trie 300 (i.e. N=9).

In Step 404, the encoding method calculates a left sub-Trie leaf count NL and a right sub-Trie leaf count RL of the current non-leaf node to be processed at the depth value D. Please note that the leaf count LC set in Step 402 is equal to a sum of the left sub-Trie leaf count NL and the right sub-Trie leaf count RL obtained from Step 404 (i.e. LC=NL+RL).

In Step 406, the encoding method checks whether the left sub-Trie leaf count NL is larger than 0 and the right sub-Trie leaf count RL is larger than 0. If both of the left sub-Trie leaf count NL and the right sub-Trie leaf count RL are larger than 0, the current non-leaf node to be processed at the depth value D is a non-leaf node with degree of 2, and Step 408 is executed. If only one of the left sub-Trie leaf count NL and the right sub-Trie leaf count RL is larger than 0, the current non-leaf node to be processed at the depth value D is a non-leaf node with degree of 1, and Step 410 is executed.

In Step 408, since the current non-leaf node to be processed at the depth value D is determined as the non-leaf node with degree of 2, this non-leaf node is encoded to record a corresponding meta data. The meta data includes the depth value of this non-leaf node in the key Trie and the leaf count of an one-sided sub-Trie of this non-leaf node. In this embodiment, the meta data records the depth value D and the left sub-Trie leaf count NL (i.e. (D, NL)). In addition, for the subsequent processing of the left sub-Trie of this non-leaf node, the encoding method adds 1 to the depth value D to update the depth value D (i.e. D=D+1), and the leaf count LC is updated by the left sub-Trie leaf count NL (i.e. LC=NL). For the subsequent processing of the right sub-Trie of this non-leaf node, the encoding method adds 1 to the depth value D to update the depth value D (i.e.

D=D+1), and the leaf count LC is updated by the right sub-Trie leaf count RL (i.e. LC=LC−NL=RL). The subsequent recursive processing of non-leaf nodes in the left sub-Trie of this non-leaf node is performed according to the same encoding operation mentioned above. However, when the leaf count LC of the left sub-Trie of this non-leaf node is not larger than 1, this means that, at larger depths, there is no non-leaf node with degree of 2 that needs to be encoded. As a result, the encoding method ends the subsequent encoding processing of this left sub-Trie at this moment. Similarly, the recursive processing of non-leaf nodes in the right sub-Trie of this non-leaf node is performed according to the same encoding operation mentioned above. However, when the leaf count LC of the right sub-Trie of this non-leaf node is not larger than 1, this means that, at larger depths, there is no non-leaf node with degree of 2 that needs to be encoded. As a result, the encoding method ends the subsequent encoding processing of this right sub-Trie at this moment.

In Step 410, since the current non-leaf node to be processed at the depth value D is determined as the non-leaf node with degree of 1, this non-leaf node is not encoded to record a corresponding meta data. The encoding method determines which value in the left sub-Trie leaf count NL and the right sub-Trie leaf count RL is larger than 0, and determines whether this value is larger than 1. If the left sub-Trie leaf count NL is larger than 1, this means that, at a larger depth in the left sub-Trie of this non-leaf node, there is still at least one non-leaf node with degree of 2 that needs to be encoded. As a result, the Step 412 is executed to add 1 to the depth value D for updating the depth value D (i.e. D=D+1), and to update the leaf count LC by the left sub-Trie leaf count NL (i.e. LC=NL). The subsequent recursive processing of non-leaf nodes in the left sub-Trie of this non-leaf node is performed according to the same encoding operation mentioned above.

If the right sub-Trie leaf count RL is larger than 1, this means that, at a larger depth in the right sub-Trie of this non-leaf node, there is still at least one non-leaf node with degree of 2 that needs to be encoded. As a result, the Step 414 is executed to add 1 to the depth value D for updating the depth value D (i.e. D=D+1), and to update the leaf count LC by the right sub-Trie leaf count RL (i.e. LC=LC−NL=RL). The subsequent recursive processing of non-leaf nodes in the right sub-Trie of this non-leaf node is performed according to the same encoding operation mentioned above.

If the left sub-Trie leaf count NL is not larger than 1, this means that, at larger depths in the left sub-Trie of this non-leaf node, there does not exist any non-leaf node with degree of 2 that needs to be encoded. As a result, the encoding process of the left sub-Trie of this non-leaf node can be skipped. Similarly, if the right sub-Trie leaf count RL is not larger than 1, this means that, at larger depths in the right sub-Trie of this non-leaf node, there does not exist any non-leaf node with degree of 2 that needs to be encoded. As a result, the encoding process of the right sub-Trie of this non-leaf node can be skipped.

Figure 5:
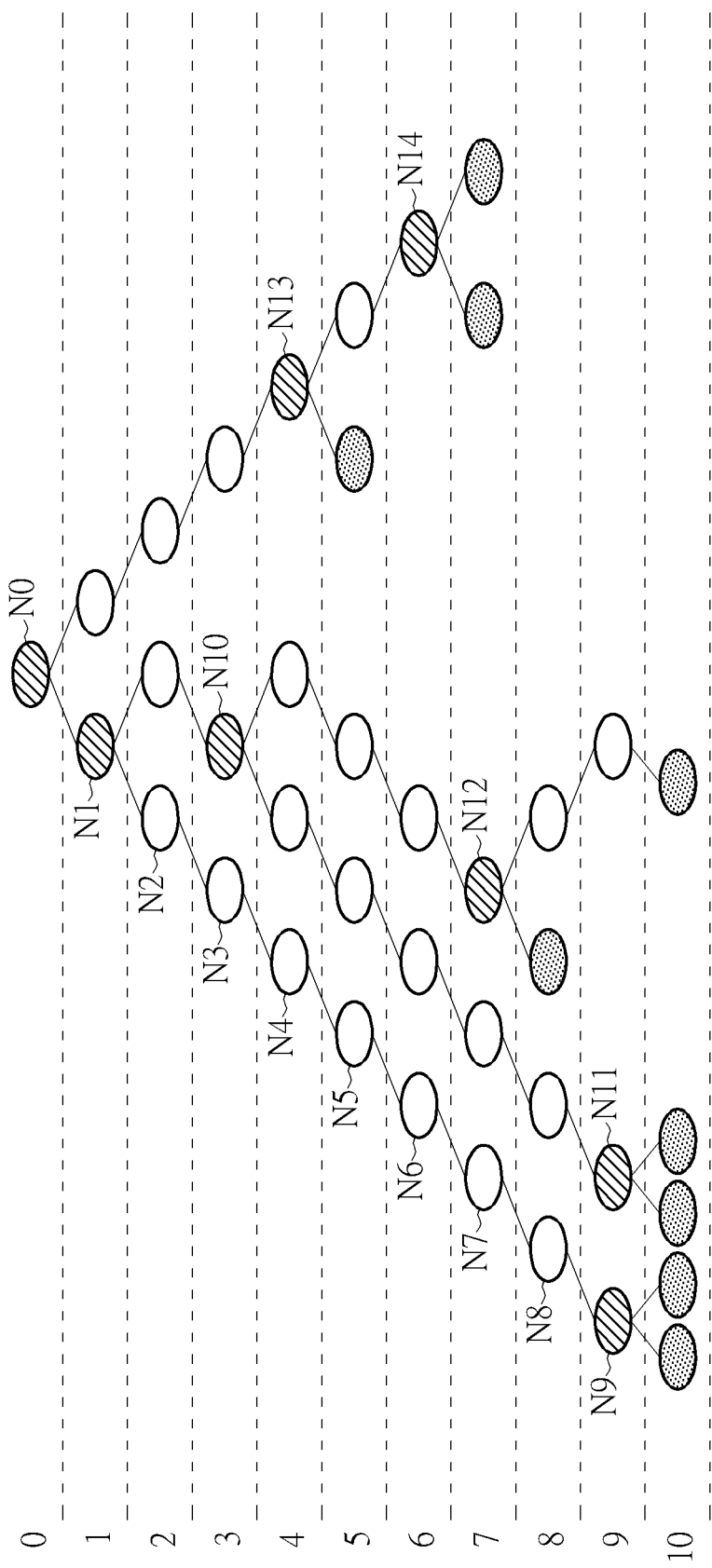
FIG. 5 is a diagram illustrating an operation of processing the key Trie shown in FIG. 3 through the encoding process shown in FIG. 4.
Figure 6:
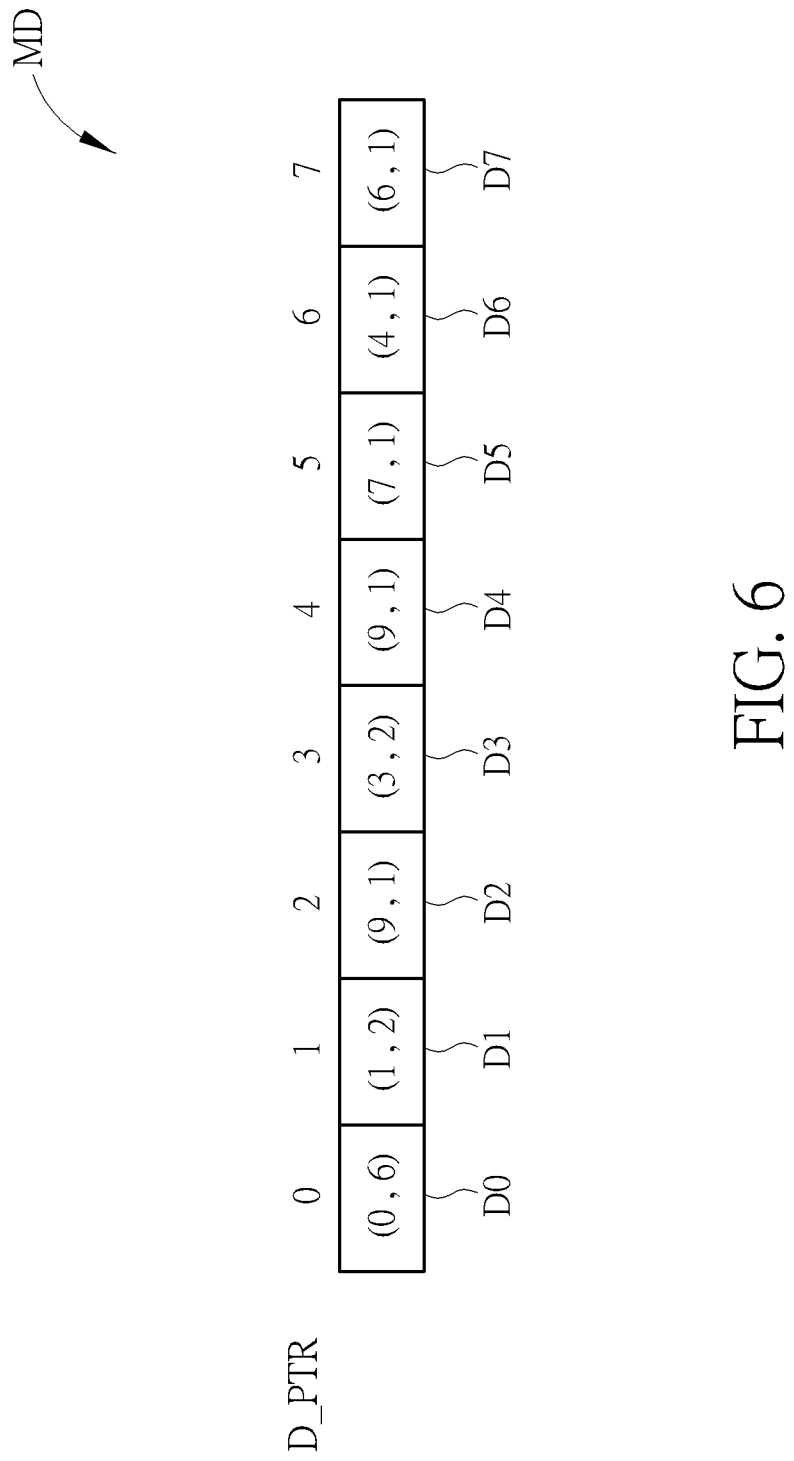
FIG. 6 is a diagram illustrating an encoding result generated by processing the key Trie shown in FIG. 3 through the encoding process shown in FIG. 4.

By using the encoding process shown in FIG. 4, each non-leaf node with degree of 2 can be found and encoded to generate a corresponding meta data as an encoding output. Please refer to FIG. 5 in conjunction with FIG. 6. FIG. 5 is a diagram illustrating an operation of processing the key Trie 300 shown in FIG. 3 through the encoding process shown in FIG. 4. FIG. 6 is a diagram illustrating the encoding result MD generated by processing the key Trie 300 shown in FIG. 3 through the encoding process shown in FIG. 4. In the beginning, the encoding process starts processing from a root node N0. In Step 402, the depth value D is set as the depth of the root node N0 (D=0), and the leaf count LC is set as the number of all keys KA-KI in the key Trie 300 (LC=9). Then, in Step 404, the left sub-Trie leaf count NL of the root node N0 is obtained to be 6 (NL=6), and the right sub-Trie leaf count RL is obtained to be 3 (RL=3). As a result, in Step 406, it is determined that both of the left sub-Trie leaf count NL and the right sub-Trie leaf count RL are greater than 0. In Step 408, the root node N0 (which is a non-leaf node) is encoded to record a meta data (0, 6) (i.e. (D, NL)=(0, 6)). For the subsequent processing of the left sub-Trie of the root node N0, in Step 408, the depth value D is updated as 1 (i.e. D=D+1=0+1=1), and the leaf count LC is set as NL (i.e. LC=NL=6). Since the leaf count LC is greater than 1, the encoding process continues on the left sub-Trie of the root node N0 subsequently. For the subsequent processing of the right sub-Trie of the root node N0, in Step 408, the depth value D is updated as (i.e. D=D+1=0+1=1), and the leaf count LC is set as RL (i.e. LC=LC−NL=RL=3). Since the leaf count LC is greater than 1, the encoding process continues on the right sub-Trie of the root node N0 subsequently.

According to the depth first traversal order, the encoding method first processes the left sub-Trie of the root node N0. Since the depth value D has been updated as 1 for the left sub-Trie of the root node N0 in Step 408, the first node to be processed in the left sub-Trie of the root node N0 is N1. In Step 404, the left sub-Trie leaf count NL of the node N1 is obtained to be 2 (NL=2) and the right sub-Trie leaf count RL is obtained to be 4 (RL=4). As a result, in Step 406, it is determined that both of the left sub-Trie leaf count NL and the right sub-Trie leaf count RL are greater than 0. In Step 408, the node N1 (which is a non-leaf node) is encoded to record a meta data (1, 2) (i.e. (D, NL)=(1, 2)). For the subsequent processing of the left sub-Trie of the node N1, in Step 408, the depth value D is updated as 2 (i.e. D=D+1=1+1=2), and the leaf count LC is set as NL (i.e. LC=NL=2). Since the leaf count LC is greater than 1, the encoding process continues on the left sub-Trie of the node N1 subsequently. For the subsequent processing of the right sub-Trie of the node N1, in Step 408, the depth value D is updated as 2 (i.e. D=D+1=1+1=2), and the leaf count LC is set as RL (i.e. LC=LC−NL=RL=4). Since the leaf count LC is greater than 1, the encoding process continues on the right sub-Trie of the node N1 subsequently.

According to the depth first traversal order, the encoding method first processes the left sub-Trie of the node N1. Since the depth value has been updated as 2 for the left sub-Trie of the node N1 in Step 408, the first node to be processed in the left sub-Trie of the node N1 is N2. In Step 404, the left sub-Trie leaf count NL of the node N2 is obtained to be 2 (NL=2) and the right sub-Trie leaf count RL is obtained to be 0 (RL=0). As a result, in Step 406, it is determined that only the left sub-Trie leaf count NL among the left sub-Trie leaf count NL and the right sub-Trie leaf count RL is greater than 0. In Step 410, it is determined that the subsequent process processes the left sub-Trie of the node N2 without processing the right sub-Trie of the node N2. For the subsequent processing of the left sub-Trie of the node N2, in Step 412, the depth value D is updated as 3 (i.e. D=D+1=2+1=3), and the leaf count LC is set as NL (i.e. LC=NL=2). Since the leaf count LC is greater than 1, the encoding process continues on the left sub-Trie of the node N2 subsequently.

According to the depth first traversal order, the encoding method processes the left sub-Trie of the node N2. Since the depth value has been updated as 3 for the left sub-Trie of the node N2 in Step 412, the first node to be processed in the left sub-Trie of the node N2 is N3. In Step 404, the left sub-Trie leaf count NL of the node N3 is obtained to be 2 (NL=2) and the right sub-Trie leaf count RL is obtained to be 0 (RL=0). As a result, in Step 406, it is determined that only the left sub-Trie leaf count NL among the left sub-Trie leaf count NL and the right sub-Trie leaf count RL is greater than 0. In Step 410, it is determined that the subsequent process processes the left sub-Trie of the node N3 without processing the right sub-Trie of the node N3. For the subsequent processing of the left sub-Trie of the node N3, in Step 412, the depth value D is updated as 4 (i.e. D=D+1=3+1=4), and the leaf count LC is set as NL (i.e. LC=NL=2). Since the leaf count LC is greater than 1, the encoding process continues on the left sub-Trie of the node N3 subsequently.

In the same way, since the nodes N4-N8 are the nodes each with degree of 1 and only have the left sub-Trie, for the subsequent processing of the left sub-Trie of the node N4, the depth value D is updated as 5 and the leaf count LC is set as 2 (Step 412); for the subsequent processing of the left sub-Trie of the node N5, the depth value D is updated as 6 and the leaf count LC is set as 2 (Step 412); for the subsequent processing of the left sub-Trie of the node N6, the depth value D is updated as 7 and the leaf count LC is set as 2 (Step 412); for the subsequent processing of the left sub-Trie of the node N7, the depth value D is updated as 8 and the leaf count LC is set as 2 (Step 412); and for the subsequent processing of the left sub-Trie of the node N8, the depth value D is updated as 9 and the leaf count LC is set as 2 (Step 412).

According to the depth first traversal order, the encoding method processes the left sub-Trie of the node N8. Since the depth value has been updated as 9 for the left sub-Trie of the node N8 in Step 412, the first node to be processed in the left sub-Trie of the node N8 is N9. In Step 404, the left sub-Trie leaf count NL of the node N9 is obtained to be 1 (NL=1) and the right sub-Trie leaf count RL is obtained to be 1 (RL=1). As a result, in Step 406, it is determined that both of the left sub-Trie leaf count NL and the right sub-Trie leaf count RL are greater than 0. In Step 408, the node N9 (which is a non-leaf node) is encoded to record a meta data (9, 1) (i.e. (D, NL)=(9, 1)). For the subsequent processing of the left sub-Trie of the node N9, in Step 408, the depth value D is updated as 10 (i.e. D=D+1=9+1=10), and the leaf count LC is set as NL (i.e. LC=NL=1). Since the leaf count LC is not greater than 1, the processing of the left sub-Trie of the node N9 is skipped subsequently. For the subsequent processing of the right sub-Trie of the node N9, in Step 408, the depth value D is updated as 10 (i.e. D=D+1=9+1=10), and the leaf count LC is set as RL (i.e. LC=LC−NL=RL=1). Since the leaf count LC is not greater than 1, the processing of the right sub-Trie of the node N9 is skipped subsequently.

According to the depth first traversal order, the encoding method processes the right sub-Trie of the node N1, the left sub-Trie of the node N10, the right sub-Trie of the node N10, the right sub-Trie of the node N0, and the right sub-Trie of the node N13, sequentially. Since a person skilled in the pertinent art can readily know the subsequent encoding operation according to above paragraphs, the description of the subsequent encoding operation is omitted here for brevity.

According to the process shown in FIG. 4, the encoding method sequentially performs encoding upon the non-leaf nodes with degree of 2 N0, N1, N9, N10, N11, N12, N13, N14 according to the depth first traversal order, and generates the corresponding meta data D0, D1, D2, D3, D4, D5, D6, D7, respectively. As shown in FIG. 6, the encoding result MD of the key Trie 300 includes 8 meta data D0-D7, wherein each meta data records the depth value D and the left sub-Trie leaf count NL. Compared with the data amount of the plurality of keys KA-KI in the key Trie 300 (e.g. the length of each key may reach 256 bytes or even longer), the data amount of the encoding result MD is relatively smaller. For example, the depth value D and the left sub-Trie leaf count NL in each meta data can be recorded with fewer bits. In other words, compared with storing the plurality of keys KA-KI in the storage device 104 to search for the input key, storing the encoding result MD in the storage device 104 to search for the input key only occupies a smaller storage space. Furthermore, as mentioned before, assuming that the number of leaf nodes is n0 and the number of nodes each with degree of 2 is n2, n0 is equal to n2 plus 1 (i.e. n0=n2+1) due to inherent characteristics of the binary tree. As a result, under the situation that the number of the plurality of keys KA-KI in the key Trie 300 is known, the number of the plurality of meta data D0-D7 included in the encoding result MD is also known. Therefore, the data amount of the encoding result MD can be known in advance to plan the storage space of the storage device 104.

When the processing circuit 102 receives an input key K_IN from the distributed storage system (e.g. the object storage system), the decoding operation can be performed according to the input key K_IN and the encoding result MD stored in the storage device 104, to obtain the key index value corresponding to the input key K_IN. Taking the key Trie 300 shown in FIG. 3 as an example, the key index values of the keys KA-KI from left to right are 0-8, respectively. If the key index value obtained at the end of the decoding operation is K_IDX, it means that the input key K_IN may be the key with the key index value K_IDX among the keys KA-KI.

Figure 7:
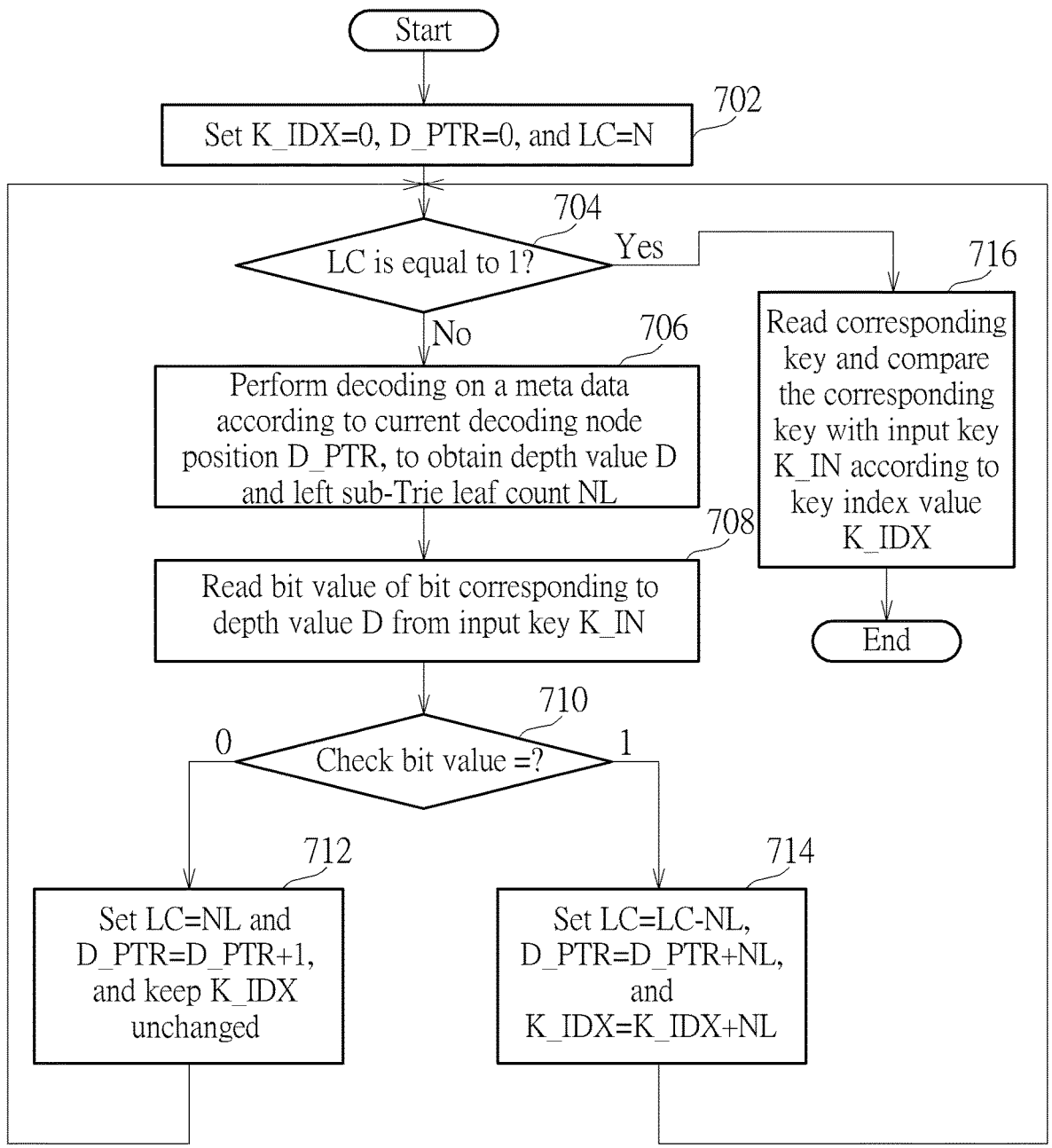
FIG. 7 is a flow chart of a decoding method for a key Trie according to an embodiment of the present invention.

FIG. 7 is a flow chart of a decoding method for a key Trie according to an embodiment of the present invention. It should be note that, if the same result can be obtained, the steps do not necessarily have to be executed in the exact order shown in FIG. 7. The decoding method is executed by the processing circuit 102. For example, the processing circuit 102 can load and execute the program code to obtain the decoding result (i.e. the key index value K_IDX corresponding to the input key K_IN). The decoding method reads a meta data in the plurality of meta data included in the encoding result MD of the key Trie from the storage device 104, wherein the meta data includes a depth value corresponding to a non-leaf node in the key Trie; according to a bit value of a bit in the input key K_IN that corresponds to the depth value, selectively update a key index value; and according to a leaf count of an one-sided sub-Trie of the corresponding non-leaf node indicated by the bit, determine whether decoding operation of the key index value finishes. If it is determined that the decoding operation of the key index value is not finished yet, another meta data is read from the storage device 104 to undergo decoding. The decoding method continues to read the meta data in the encoding result MD until the decoding operation of the key index value finishes. Further description is described as follows.

In Step 702, the decoding method first initializes some parameters, such that the key index value K_IDX is set by the initial value 0 (K_IDX=0), the current decoding node position D_PTR is set by the initial value 0 (D_PTR=0), and the leaf count LC is set by the initial value N (LC=N). Taking the key Trie 300 shown in FIG. 3 as an example, the leaf count related to the root node is the number of all keys included in the key Trie 300. As a result, the initial value N of the leaf count LC is equal to 9 (N=9). In addition, taking the encoding result MD of the key Trie 300 shown in FIG. 6 as an example, the decoding node positions D_PTR corresponding to the plurality of meta data D0-D7 are 0-7, respectively. As a result, the decoding method starts decoding from the meta data D0 at the decoding node position D_PTR=0.

In Step 704, the decoding method determines whether the leaf count LC is equal to 1. If the leaf count LC is equal to 1, it means that the corresponding leaf node has been found in the key Trie according to the input key K_IN. As a result, the decoding operation of the key index value can finish. If the leaf count LC is greater than 1, it means that the corresponding leaf node has not been found in the key Trie according to the input key K_IN. As a result, the decoding operation of the key index value continues running.

In Step 706, the decoding method performs decoding according to the current decoding node position D_PTR, to read a meta data in the plurality of meta data included in the encoding result MD of the key Trie from the storage device 104. As mentioned before, each meta data records the depth value D and the left sub-Trie leaf count NL. The depth value D obtained by performing decoding upon the meta data in Step 706 is used in Step 708, and the left sub-Trie leaf count NL obtained by performing decoding upon the meta data in Step 706 is used in Step 712 or Step 714, depending on the determination result of Step 710.

In Step 708, the decoding method is performed by reading the bit value of the bit corresponding to the depth value D from the input key K_IN.

In Step 710, the decoding method checks whether the bit value of the bit corresponding to the depth value D in the input key K_IN is 1 or 0. If it is 0, the Step 712 is entered. If it is 1, the Step 714 is entered.

In Step 712, the decoding method updates the leaf count LC as the left sub-Trie leaf count NL (i.e. LC=NL), and adds 1 to the current decoding node position D_PTR (i.e. D_PTR=D_PTR+1). In addition, the current key index value K_IDX keeps unchanged. The decoding process then returns to Step 704 to determine whether the decoding operation of the key index value K_IDX finishes.

In Step 714, the decoding method updates the leaf count LC as the right sub-Trie leaf count RL (i.e. LC=LC−NL=RL), and adds the left sub-Trie leaf count NL to the current decoding node position D_PTR (i.e.D_PTR=D_PTR+NL). In addition, the left sub-Trie leaf count NL is added to the current key index value K_IDX (i.e. K_IDX=K_IDX+NL). The decoding process then returns to Step 704 to determine whether the decoding operation of the key index value K_IDX finishes.

When it is determined that the decoding operation of the key index value K_IDX has finished (Step 704), the decoding method then executes Step 716 to verify the input key K_IN. Since the data amount of the plurality of keys KA-KI in the key Trie 300 is large, they are stored in the external storage device of the electronic device 100 in practice, such as the Hard Disk Drive (HDD) or the solid-state drive (SSD). In Step 716, the decoding method obtains a storage address ADDR corresponding to the key according to the finally decoded key index value K_IDX, and reads the corresponding key recorded in the storage address ADDR from the external storage device. Then, the input key K_IN is compared with the corresponding key retrieved from the external storage device. If the two keys match, it means that the search of the input key K_IN is correct. As a result, a value paired with the input key K_IN can be read from the external storage device subsequently. If the two keys do not match, it means that the input key K_IN does not belong to the key Trie 300.

Figure 8:
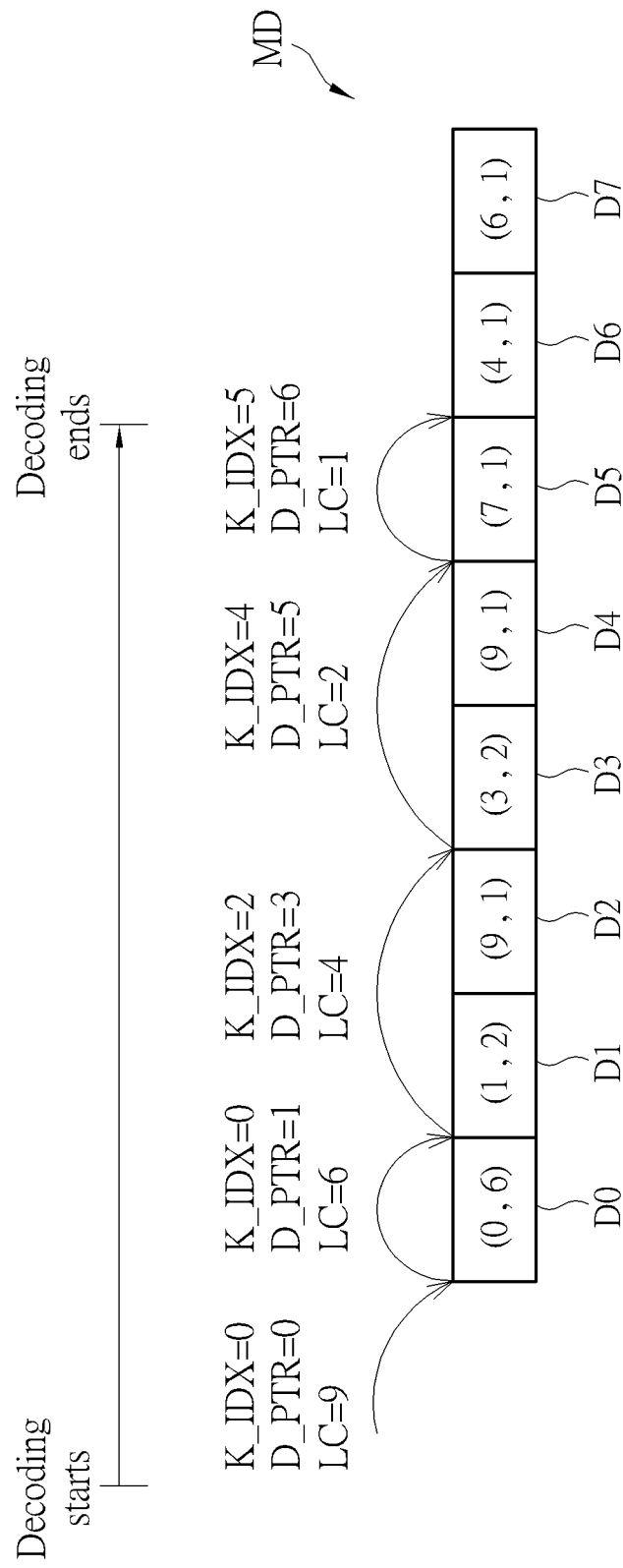
FIG. 8 is a diagram illustrating an example of generating a key index value of an input key by processing an encoding result of a key Trie through the decoding process shown in FIG. 7.

By using the decoding process shown in FIG. 7, the key index value K_IDX of the input key K_IN can be determined from the index information provided by the encoding result MD of the key Trie 300. Please refer to FIG. 8 in conjunction with FIG. 5. FIG. 8 is a diagram illustrating an example of generating the key index value K_IDX of the input key K_IN by processing the encoding result MD of the key Trie 300 through the decoding process shown in FIG. 7. It is assumed that the input key K_IN to be decoded is a key KF (i.e. K_IN=0101000110). In the beginning, Step 702 is executed to set the key index value K_IDX as 0, set the current decoding node position D_PTR as 0, and set the leaf count LC as the initial value 9, respectively. Since the leaf count LC is not equal to 1 at this moment, Step 706 is executed to decode the meta data D0 according to the current decoding node position D_PTR, to obtain the depth value 0 (D=0) and the left sub-Trie leaf count 6 (NL=6). In Step 708, the bit value of the bit of the input key K_IN located at the depth value 0 is obtained as 0. As a result, in Step 710, it is determined that Step 712 is entered subsequently. In Step 712, the key index value K_IDX remains as 0, the current decoding node position D_PTR is updated as 1 (D_PTR=D_PTR+1), and the leaf count LC is updated as 6 (LC=NL).

The decoding process then returns to Step 704. Since the leaf count LC is still not equal to 1 at this moment, Step 706 is executed to decode the meta data D1 to obtain the depth value 1 (D=1) and the left sub-Trie leaf count 2 (NL=2) according to the current decoding node position D_PTR. In Step 708, the bit value of the bit of the input key K_IN located at the depth value 1 is obtained as 1. As a result, in Step 710, it is determined that Step 714 is entered subsequently. In Step 714, the key index value K_IDX is updated as 2 (K_IDX=K_IDX+2), the current decoding node position D_PTR is updated as 3 (D_PTR=D_PTR+2), and the leaf count LC is updated as 4 (LC=LC−NL).

The decoding process then returns to Step 704. Since the leaf count LC is still not equal to 1 at this moment, Step 706 is executed to decode the meta data D3 according to the current decoding node position D_PTR, to obtain the depth value 3 (D=3) and the left sub-Trie leaf count 2 (NL=2). In Step 708, the bit value of the bit of the input key K_IN located at the depth value 3 is obtained as 1. As a result, in Step 710, it is determined that Step 714 is entered subsequently. In Step 714, the key index value K_IDX is updated as 4 (K_IDX=K_IDX+2), the current decoding node position D_PTR is updated as 5 (D_PTR=D_PTR+2), and the leaf count LC is updated as 2 (LC=LC−NL).

The decoding process then returns to Step 704. Since the leaf count LC is still not equal to 1 at this moment, Step 706 is executed to decode the meta data D5 according to the current decoding node position D_PTR, to obtain the depth value 7 (D=7) and the left sub-Trie leaf count 1 (NL=1). In Step 708, the bit value of the bit of the input key K_IN located at the depth value 7 is obtained as 1. As a result, in Step 710, it is determined that Step 714 is entered subsequently. In Step 714, the key index value K_IDX is updated as 5 (K_IDX=K_IDX+1), the current decoding node position D_PTR is updated as 6 (D_PTR=D_PTR+1), and the leaf count LC is updated as 1 (LC=LC−NL).

The decoding process then returns to Step 704. Since the leaf count LC is equal to 1 now, the decoding operation of the key index value K_IDX finishes. Since the key index value K_IDX is 5 at this moment, the final key index value K_IDX of the input key K_IN obtained by the decoding process is 5.

In the above-mentioned decoding operation, each meta data records the depth value and the left sub-Trie leaf count. However, this is for illustrative purposes only, and is not meant to be a limitation of the present invention. In another embodiment, each meta data can be modified to record the depth value and the right sub-Trie leaf count, and the decoding operation is modified accordingly, which can also achieve the purpose of determining the key index value of the input key. Such an alternative design also falls into the scope of the present invention.

Regarding the encoding operation, it is assumed that the number of the plurality of keys included in the key group is N and the maximum length of the key is M bits. Each non-leaf node with degree of 2 in the key Trie is encoded to generate a meta data (D, NL), wherein the depth value D needs $\log_2 M$ bits for storage, and the left sub-Trie leaf count NL needs $\log_2 N$ bits for storage. As a result, the decoding method of the present invention requires the buffer size of the storage device 104 to be $(N-1)*(\log_2 M+\log_2 N)$. Since the buffer size requirement $(N-1)*(\log_2 M+\log_2 N)$ is fixed, the storage device 104 can be easily managed. In addition, regarding the decoding operation, at most (N-1) meta data stored in the storage device 104 needs to be decoded, so the complexity of the worst case is O(N), and the complexity of the general case is O(log N). Therefore, the decoding method of the present invention is very fast and efficient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An encoding method for a key Trie, comprising:
reducing a storage space of a storage device required for an encoding result and improving an encoding efficiency of a processing circuit by:
  in response to the key Trie comprising a plurality of first non-leaf nodes with degree equal to 1 and a plurality of second non-leaf nodes with degree greater than 1, generating a plurality of meta data by only applying encoding to the plurality of second non-leaf nodes of the key Trie; and
  storing the encoding result of the key Trie into the storage device, wherein the encoding result comprises the plurality of meta data corresponding to the plurality of second non-leaf nodes, respectively;
  wherein the steps of generating the plurality of meta data by only applying encoding to the plurality of second non-leaf nodes of the key Trie and storing the encoding result of the key Trie into the storage device are performed by the processing circuit;
  wherein the storage device is an on-chip memory or an off-chip memory, and the processing circuit is a general purpose processor or a field programmable logic gate (FPGA).

2. The encoding method of claim 1, wherein the degree of each second non-leaf node in the plurality of second non-leaf nodes is equal to 2.

3. The encoding method of claim 1, wherein each meta data in the plurality of meta data comprises a depth value of a corresponding non-leaf node in the key Trie.

4. The encoding method of claim 1, wherein each meta data in the plurality of meta data comprises a leaf count of an one-sided sub-Trie of a corresponding non-leaf node.

5. The encoding method of claim 4, wherein the one-sided sub-Trie is a left-sided sub-Trie.

6. The encoding method of claim 1, wherein the plurality of meta data are sequentially stored in the storage device according to an order of depth first traversal of the plurality of second non-leaf nodes.

7. The encoding method of claim 1, wherein the key Trie corresponds to a plurality of keys in a key-value store.

8. A decoding method for a key Trie, comprising:
reducing a storage space of a storage device required for an encoding result and improving an encoding efficiency of a processing circuit by:
  reading, by the processing circuit, a meta data in a plurality of meta data comprised in an encoding result of the key Trie from the storage device, wherein the meta data comprises a depth value of a corresponding non-leaf node in the key Trie, the key Trie comprises a plurality of first non-leaf nodes with degree equal to 1 and a plurality of second non-leaf nodes with degree greater than 1, the encoding result is generated by only applying encoding to the plurality of second non-leaf nodes of the key Trie, the storage device is an on-chip memory or an off-chip memory, and the processing circuit is a general purpose processor or a field programmable logic gate FPGA);
according to a bit value of a bit in an input key that corresponds to the depth value, selectively updating a key index value by the processing circuit;
according to a leaf count of an one-sided sub-Trie of the corresponding non-leaf node indicated by the bit, determining whether decoding operation of the key index value finishes by the processing circuit;
after determining that the decoding operation of the key index value finishes, reading a corresponding key according to the key index value by the processing circuit, and comparing the corresponding key and the input key by the processing circuit, to determine whether the input key matches the corresponding key;
in response to the input key matching the corresponding key, reading, by the processing circuit, a value paired with the input key according to a storage address corresponding to the corresponding key; and
in response to the input key not matching the corresponding key, determining that the input key does not belong to the key Trie by the processing circuit.

9. The decoding method of claim 8, wherein the meta data further comprises a leaf count of the one-sided sub-Trie of the corresponding non-leaf node, and selectively updating the key index value comprises:
  when the bit value of the bit is equal to a first bit value, keeping the key index value unchanged; and
  when the bit value of the bit is equal to a second bit value, updating the key index value by adding the leaf count of the one-sided sub-Trie of the corresponding non-leaf node to the key index value.

10. The decoding method of claim 9, wherein the first bit value is 0, and the second bit value is 1.

11. The decoding method of claim 8, wherein the plurality of meta data are sequentially stored in the storage device, and the decoding method further comprises:
  after determining that the decoding operation of the key index value is not finished yet, referring to an order of the plurality of meta data for reading a meta data immediately following the meta data from the storage device.

12. The decoding method of claim 8, wherein the plurality of meta data are sequentially stored in the storage device, the meta data further comprises a leaf count of an one-sided sub-Trie of the corresponding non-leaf node, and the decoding method further comprises:

after determining that the decoding operation of the key index value is not finished yet, reading another meta data in the plurality of meta data from the storage device according to an order of the meta data in the plurality of meta data and the leaf count of the one-sided sub-Trie of the corresponding non-leaf node.

13. The decoding method of claim 12, wherein an order of the another meta data in the plurality of meta data is equal to the order of the meta data in the plurality of meta data plus the leaf count of the one-sided sub-Trie of the corresponding non-leaf node.

14. The decoding method of claim 8, wherein the key Trie corresponds to a plurality of keys in a key-value store.

15. An electronic device, comprising:
a storage device; and
a processing circuit, arranged to reduce a storage space of the storage device required for an encoding result and improve an encoding efficiency by:
  in response to a key Trie comprising a plurality of first non-leaf nodes with degree equal to 1 and a plurality of second non-leaf nodes with degree greater than 1, generating a plurality of meta data by only applying encoding to the plurality of second non-leaf nodes of the key Trie; and
  storing the encoding result of the key Trie into the storage device;
wherein the encoding result comprises the plurality of meta data corresponding to the plurality of second non-leaf nodes, respectively;
wherein the storage device is an on-chip memory or an off-chip memory, and the processing circuit is a general purpose processor or a field programmable logic gate (FPGA).

16. An electronic device, comprising:
a storage device; and
a processing circuit, arranged to reduce a storage space of the storage device required for the encoding result and improve an encoding efficiency by:
  reading a meta data in a plurality of meta data included in an encoding result of a key Trie from the storage device, wherein the meta data comprises a depth value of a corresponding non-leaf node in the key Trie, the key Trie comprises a plurality of first non-leaf nodes with degree equal to 1 and a plurality of second non-leaf nodes with degree greater than 1, and the encoding result is generated by only applying encoding to the plurality of second non-leaf nodes of the key Trie;
wherein the processing circuit is further arranged to:
  according to a bit value of a bit in an input key that corresponds to the depth value, selectively update a key index value;
  according to a leaf count of an one-sided sub-Trie of the corresponding non-leaf node indicated by the bit, determine whether decoding operation of the key index value finishes;
  after determining that the decoding operation of the key index value finishes, read a corresponding key according to the key index value by the processing circuit, and compare the corresponding key and the input key by the processing circuit, to determine whether the input key matches the corresponding key;
  in response to the input key matching the corresponding key, read a value paired with the input key according to a storage address corresponding to the corresponding key; and
  in response to the input key not matching the corresponding key, determine that the input key does not belong to the key Trie;
wherein the storage device is an on-chip memory or an off-chip memory, and the processing circuit is a general purpose processor or a field programmable logic gate (FPGA).

* * * * *